United States Patent [19]

Shukla et al.

[11] Patent Number: 5,525,280
[45] Date of Patent: Jun. 11, 1996

[54] METHOD OF MAKING A PRESSURE TRANSDUCER APPARATUS

[75] Inventors: Vishwa N. Shukla, North Attleboro, Mass.; Stanley J. Lukasiewicz, Rumford, R.I.; Francois A. Padovani, Westwood, Mass.

[73] Assignee: Texas Instruments Incorporated, Dallas, Tex.

[21] Appl. No.: 224,219

[22] Filed: Apr. 7, 1994

Related U.S. Application Data

[62] Division of Ser. No. 972,680, Nov. 6, 1992.

[51] Int. Cl.⁶ ............ B32B 31/12; B32B 31/26; C04B 33/32; G01L 9/12
[52] U.S. Cl. .............. 264/59; 156/89; 156/233; 264/61; 264/62; 264/65; 264/66; 73/718; 73/724; 361/283.4
[58] Field of Search ............ 73/718, 724, 780; 361/283.1, 283.3, 283.4; 156/81, 89, 233; 264/59, 61, 62, 65, 66

[56] References Cited

U.S. PATENT DOCUMENTS

| | | | |
|---|---|---|---|
| 3,858,097 | 12/1974 | Polye | 361/283.1 |
| 4,481,497 | 11/1984 | Kurtz et al. | |
| 4,542,436 | 9/1985 | Carusillo | 361/283.4 |
| 4,591,470 | 5/1986 | Goto et al. | 264/59 |
| 4,716,492 | 12/1987 | Charboneau et al. | |
| 4,788,096 | 11/1988 | Kalnin et al. | |
| 4,830,799 | 5/1989 | LaRoche, Jr. | 264/59 |
| 4,882,110 | 11/1989 | Kramer et al. | 264/63 |
| 4,894,635 | 1/1990 | Yajima et al. | |
| 4,935,841 | 6/1990 | Jonsson et al. | 361/283.4 |
| 4,991,283 | 2/1991 | Johnson et al. | |
| 5,005,421 | 4/1991 | Hegner et al. | 361/283.4 X |
| 5,044,202 | 9/1991 | Southworth et al. | |
| 5,189,916 | 3/1993 | Mizumoto et al. | 361/283.4 X |
| 5,201,228 | 4/1993 | Kojima et al. | 361/283.4 X |
| 5,255,427 | 10/1993 | Hafner | 264/56 X |
| 5,349,492 | 9/1994 | Kimura et al. | 361/283.4 |

Primary Examiner—David A. Simmons
Assistant Examiner—M. Curtis Mayes
Attorney, Agent, or Firm—Russell E. Baumann; Richard L. Donaldson; Rene' E. Grossman

[57] ABSTRACT

A monolithic capacitive pressure transducer is shown composed of ceramic material having a closed cavity formed near a surface thereof and having capacitor plates formed on two opposed surfaces defining the cavity. Vias are formed extending from the capacitor plates to permit electrical connection therewith. The transducer is made by separately forming under pressure a diaphragm and a base having a recess in the top surface using ceramic powder coated with an organic binder. A metal layer is deposited on the two pieces and the pieces are then joined together to form a single unit. A spacer may be inserted in the recess to ensure that a predetermined gap is maintained between the two parts during the joining operation. The parts are then debinderized by heating in air to a first temperature level to allow the binder organics, as well as the spacer organics if a spacer is employed, to be vaporized and/or decomposed and removed through the open pores of the diaphragm and base. The unit is then brought up to a sintering temperature in a reducing atmosphere to change it into a monolithic body and to convert the metallized layer into a conductive layer bonded to the ceramic.

15 Claims, 3 Drawing Sheets

METHOD OF MAKING A PRESSURE TRANSDUCER APPARATUS

This application is a division of application Ser. No. 07/972,680, filed Nov. 6, 1992.

BACKGROUND OF THE INVENTION

The invention relates generally to pressure sensors and more particularly to pressure responsive variable parallel plate capacitive transducers. Such transducers are shown and described, for example, in U.S. Pat. No. 4,716,492, assigned to the assignee of the present invention. A capacitive transducer is shown in the patent having a thin ceramic diaphragm mounted in closely spaced, sealed, overlying relation on a ceramic base, with metal coatings deposited on respective opposing surfaces of the diaphragm and the base to serve as capacitor plates arranged in predetermined closely spaced relation to each other to form a capacitor. Transducer terminals connected to the capacitor plates are arranged at an opposite surface of the transducer base and a signal conditioning electrical circuit connected to the transducer terminals is mounted on the transducer. A cup-shaped connector body of electrical insulating material is fitted over the electrical circuit and is secured to the transducer by a housing sleeve which has a port for exposing the transducer diaphragm to an applied pressure. The diaphragm is movable in response to variations in pressure applied to the diaphragm to vary the capacitance of the capacitor and the electrical circuit provides an electrical output signal corresponding to the applied pressure.

In order to maximize the economies of mass production to lower the transducer cost and thereby make such transducers economically feasible for a wide number of applications, including many previously served by low cost mechanical transducers, a standard size package is selected small enough to be received in a large number of applications yet large enough to provide a reliable signal. The size of the package determines the maximum size of the capacitor plates which, along with the gap between the plates, determines the capacitance signal. This results in limiting the size of the capacitor plates to a smaller size than would be ideal for many applications and relying on the electrical circuit to properly condition the signal. The circuit, on the other hand, requires a minimum level of capacitance for it to be able to effectively condition the output signal and this in turn affects the distance or gap required between the capacitor plates to produce the minimum capacitance level. In transducers of the type disclosed in U.S. Pat. No. 4,716,492 distances between the plates are in the order of 10–17 microns.

One approach described in the above patent to provide this selected gap employs a cup-shaped member having a relatively rigid rim secured to a base substrate placing a bottom of the cup in selected, spaced, overlying relation to a capacitor plate on the base substrate. An electrically conductive layer is disposed on the inner surface of the cup bottom to provide the second capacitor plate with the bottom being resiliently flexible to serve as a diaphragm to move the second plate toward and away from the first capacitor plate in response to variations in fluid pressure applied to the outer surface of the bottom of the cup. The configuration of the cup-shaped member, however, is not conducive to low cost manufacturing techniques. Due, in part, to the small sizes involved it is very difficult to obtain consistent flat surfaces on the cup bottoms which are parallel to the substrate surface. Slight variations from device to device cause changes in capacitance signals produced by the transducers which frequently fall outside the window of values acceptable by the signal conditioning circuitry.

Another approach described in the above patent employs a flat diaphragm element secured to the base substrate in selectively spaced relation thereto by disposing a spacing and securing medium such as a mixture of glass frit including a plurality of balls of glass of selected diameter between the flat diaphragm and the substrate at the periphery of the diaphragm. The glass frit is selected to be fusible at a first temperature at which the balls remain unfused and the mixture is then heated to the fusing temperature of the frit to secure the diaphragm to the substrate at a spacing from the substrate determined by the diameter of the balls. The provision of flat surfaces which extend over the entire diaphragm as well as the base substrate is very conducive to consistent, reproducible results from device to device; however, the flat surfaces generally require grinding to ensure that the surfaces are parallel to one another. Further, the use of the glass material to both space and secure the diaphragm to the base results in undesirable yield losses due to various factors such as unevenness sometimes occurring due to imperfections in the grinding process, variations in the compressive force used to clamp the diaphragms to the base when the device is fired to fuse the glass and other process variables such as the specific temperature profile of the firing and the specific glass composition employed.

In U.S. Pat. No. 5,044,202, assigned to the assignee of the instant invention, a curved recess is formed in the base over which a flat, flexible diaphragm is disposed. The spacing between capacitor plates deposited on the diaphragm and a central portion of the recess is determined by the curvature of the recess. Sealant material such as glass is disposed on the outer marginal portion of the curved surface of the recess. While this structure provides a reliable, accurate sensor it requires an extra grinding operation to form the recess which adds to the expense of the device.

SUMMARY OF THE INVENTION

It is therefore an object of the invention to provide a less expensive pressure responsive, variable parallel plate capacitive transducer having consistent spacing between its capacitor plates from one transducer to another. Another object is the provision of a pressure responsive capacitive transducer which has improved yield in its manufacture. Yet another object is the provision of such a transducer which has improved reliability and is long lasting.

Another object is the provision of a method for making such a transducer.

Briefly, a transducer made in accordance with the invention comprises a body of ceramic material having a cavity formed therein closely adjacent an outer surface thereof. Metal capacitor plates are deposited on opposite sides of two surfaces defining the cavity with vias extending to terminal areas. The ceramic comprises conventional material such as 80% by weight alumina up to essentially 100% with the balance being additives to form a glass at a sintering temperature. The ceramic is provided in powdered form coated with an organic binder, as a spray dried powder, ready for pressing into any selected configuration. First and second portions, i.e., a diaphragm and a base having a recess formed in an outer face surface, are formed by pressing the powder in a die. In one embodiment, metallized coatings of high temperature material such as molybdenum/manganese in the form of a thick film paste, are deposited as by screen printing on one surface of the diaphragm portion and on the recessed outer face surface of the base portion. The vehicle used in the thick paste is then removed, preferably by heating. According to a feature of the invention in one embodiment, spacer means of organic material may be placed in the recess to ensure that the cavity gap is maintained during the following pressing step. The two portions are then pressed together to form a single unit and then the unit is heated in an air atmosphere to a first debinderizing temperature. After the organics, including the spacer means, are vaporized/decomposed and released through the still open cells of the ceramic, the unit is placed in a high temperature oven and co-fired in a reducing atmosphere with the metal layers forming a conductive coating bonded to the ceramic and the ceramic being sintered together to form a monolithic, closed cell body.

According to a modified embodiment, low temperature ceramic materials are used for the ceramic which can be sintered at a temperature low enough to permit the use of conventional printed circuit inks fired in an air atmosphere.

According to another modified embodiment, the metallization is printed on the spacer means which is then transferred to the ceramic material during the step of pressing the two portions together.

BRIEF DESCRIPTION OF THE DRAWINGS

Other objects, advantages and details of the novel and improved capacitive pressure transducer of the invention and method of making appear in the following detailed description of preferred embodiments of the invention, the detail description referring to the drawings in which.

Figure 4:
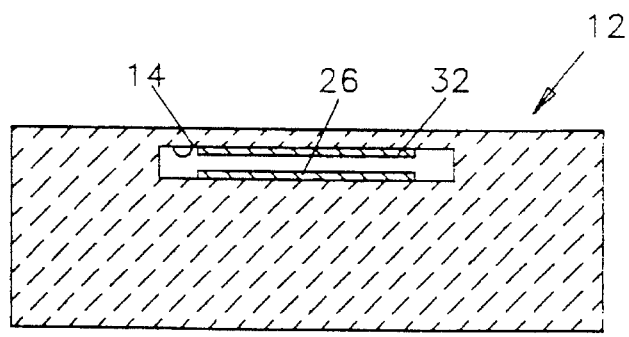
FIG. 4 is a cross section taken through a unit after it has been sintered.
Figure 5:
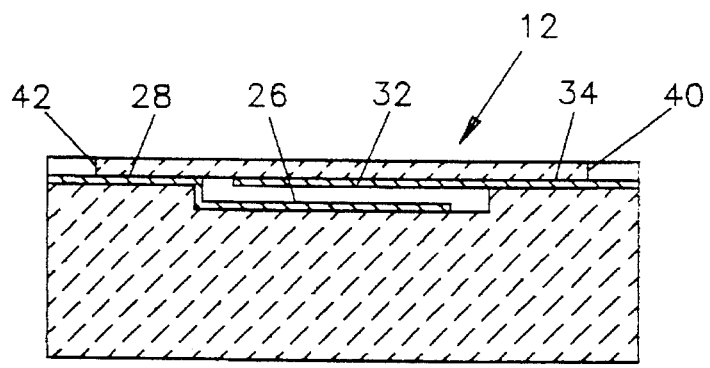
FIG. 5 is a cross section taken through the FIG. 4 unit in a direction chosen to include the vias extending from the capacitor plates.

With particular reference to FIGS. 4 and 5 of the drawings, a pressure responsive, variable capacitive transducer made in accordance with the invention comprises a monolithic body of ceramic material having a cavity formed therein closely adjacent an outer surface of the body. Capacitor plates formed of suitable material such as metal, as will be described below, are disposed on opposed surfaces of the cavity with vias extending from the plate to respective terminal pads for connection to externally disposed signal conditioning electrical circuitry (not shown).

Although various ceramic materials can be utilized such as cordierite, mullite, etc., according to a first embodiment of the invention, a suitable composition comprises between approximately 80% by weight up to essentially 100% alumina with the balance being additives which form a glass at the sintering temperature of the alumina. Such material is conventional in the electronic substrate industry and can be either purchased as a spray dried powder ready to press or can be specifically formulated and spray dried according to known techniques to produce a free-flowing, granulated powder ready for pressing (numeral 1 in FIG. 3). The spray dried powder contains the alumina and an organic binder such as polyvinyl alcohol or other plastic to serve as a temporary adhesive holding the powder together after pressing until the resultant pressed material is sintered.

Figure 1:
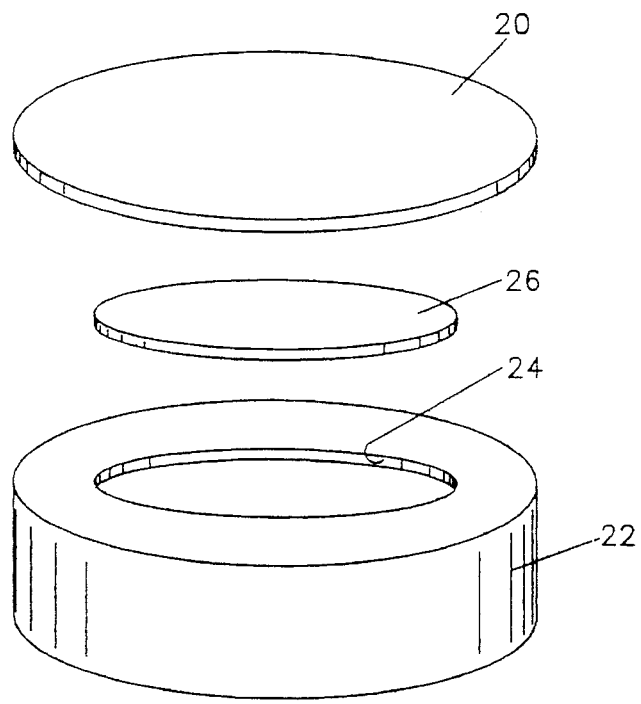
FIG. 1 is a blown apart perspective view of a diaphragm, a base and a spacer means prior to being formed in a unitary body.

The alumina spray dried powder is pressed (numeral 2 of FIG. 3) into the shapes of a generally cylindrical diaphragm and a base as shown in FIG. 1 at 20, 22 respectively, using a pressure in the range of approximately 1,000–30,000 psi. As seen in the figure a recess or depression 24 of a selected depth of between 0.001 to 0.010 inches is formed in one end face of base 22 at the time it is formed although, if desired, the recess could be formed wholly or partially in the diaphragm as well. The depth of the recess is selected to allow for the shrinkage of the materials, including the capacitor plates, to provide spacing between the electrodes from approximately 0.5 to 2.5 mils in the finished transducer.

After the initial pressing, the diaphragm 20 and base 22 are strong enough to permit handling. A selected electrode pattern is applied (numeral 3 of FIG. 3) to the bottom surface of the diaphragm 20 and top surface of base 22 (FIGS. 2a, 2b respectively) by any suitable means, such as screen printing. Any suitable high temperature metal can be used such as tungsten, molybdenum/manganese, platinum or other high temperature material such as a conductive ceramic. For screen printing the metallization is applied in the form of conventional thick film paste which typically contains certain solvents to adjust viscosity for screen printing. After application the solvents can be removed slowly at room temperature or more rapidly by placing the parts into an air oven at approximately 100° C. (numeral 4 of FIG. 3).

Although it is possible to press the diaphragm and base together without any spacing means placed therebetween and still maintain a gap between the diaphragm and the bottom of the recessed area, particularly with relatively large gaps, it is preferred to use a fugitive spacer, particularly with relatively smaller gaps. That is, a spacer helps to maintain the separation between the two electrodes and prevent the two electrodes from engaging one another during the next step of pressing the diaphragm to the base. A fugitive spacer element 26 composed of essentially non-compressible, consumable or decomposable material and having a thickness preferably essentially equal to the desired spacing between the electrodes or a plurality of sheets of such material the total thickness of which preferably essentially equals the desired spacing is placed in recess 24 (numeral 5 of FIG. 3). The spacer material is selected so that it is clean burning, i.e., so that there is no ash remaining after the spacer has been thermally removed after pressing the base and diaphragm together. Propylene carbonate and Delrin, a trademark of E. I. du Pont de Nemours Company for acetal, thermoplastic resin, are two such materials, and can be used in various thicknesses depending upon the desired gap. In transducers made in accordance with the invention spacers from 0.001 to 0.006 inches thick have been used. That is, multiple spacers can be employed to accommodate any selected gap dimension.

Figure 3:
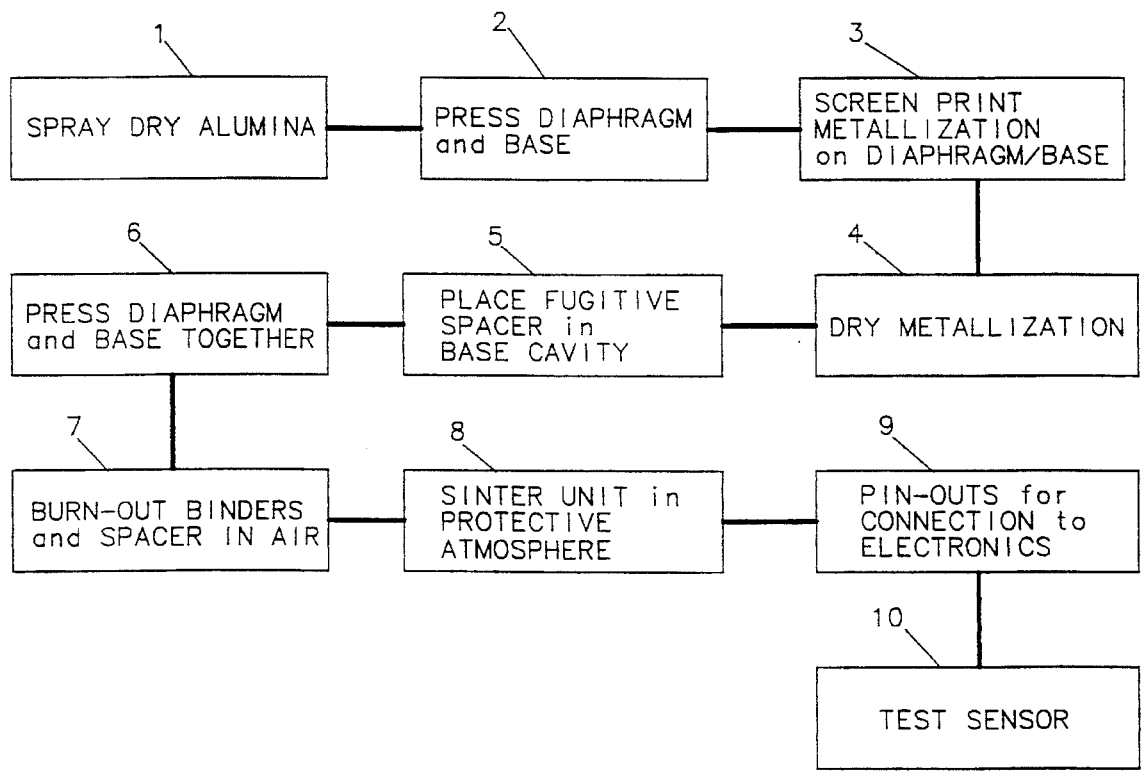
FIG. 3 is a flow chart showing the process steps for fabricating a monolithic sensor in accordance with the invention.

As seen at 6 in FIG. 3, diaphragm 20 and base 22 are then placed into a die or suitable isostatic press and pressed together using a pressure in a range between approximately 1,000 and 30,000 psi.

The diaphragm and base, now pressed together to form a single body or unit is placed in an oven and heated in an air atmosphere at relatively low temperatures, e.g., 300° C. in order to evaporate and burn out the binders and spacer material and allow the evaporated matter and combustion gasses to pass through the pores of the body before the body is sintered and the pores closed (numeral 7 of FIG. 3). The temperature is limited by the maximum temperature at which the metallization can be heated in an air or oxygen atmosphere without significant oxidation.

After removing as much as possible of the organic binder and the spacer material during the debinderizing operation, the assembled unit is placed into a high temperature furnace and sintered in the range of approximately 1400°–17000° C. in a reducing atmosphere (numeral 8 of FIG. 3). Typically the atmosphere contains approximately 1–100% hydrogen with the balance usually nitrogen or cracked ammonia.

With appropriate binders in the spray dried powder and with an appropriate polymer for the spacing means if one is used, it will be appreciated that the debinderization step could be accomplished as part of the firing cycle.

The specific materials for the metallization and the ceramic are chosen so that the shrinkage rates are close enough to each other to prevent warpage. Further, the thermal contraction of the materials should be sufficiently similar and the temperature profile employed during cooling from the firing temperature such that the cracking does not occur.

Sintering the alumina converts the unit into a monolithic device as shown at 12 in FIG. 4 having a cavity or gap 14 with an atmosphere determined by the sintering atmosphere of the furnace. For vacuum devices the furnace atmosphere could be evacuated prior to reaching the sintering temperature or a suitable hole could be pressed into the base when originally formed. The device could be evacuated after sintering and the hole sealed with suitable sealant material. The sintering step is also used to effect bonding of the metallization layer to the alumina and form a conductive layer.

After the unit has been fired electrical connection means are added as by attaching pins to the metallized vias with conductive epoxy (numeral 9 of FIG. 3) and may be tested as indicated at 10 of FIG. 3. Any suitable notches or the like to provide access to the vias can be provided during the original pressing step. As seen in FIG. 5 the diaphragm may be notched at 40 and 42 to provide access to the terminal pad. The via extending from the diaphragm can be bridged over to a terminal pad on base 22.

In accordance with the invention a device was made using 96% by weight alumina. This was pressed into top and bottom cylindrical portions using approximately 5,000 psi with a depression of approximately 0.006 inches formed in the bottom portion. A metallization layer of molybdenum/manganese thick film paste was applied by screen printing onto one face of the top portion and the recessed face of the bottom portion. The solvents of the thick film paste were removed by placing the parts in an air oven at approximately 100° C. Two sheets of propylene carbonate each having a thickness of 0.003 inches were placed in the recess to serve as a spacer and the parts were then placed in a die and pressed together using a pressure of approximately 10,000 psi. The assembled parts were then heated in air at 0.5 C./min. to 300° C. (5 hour soak) to remove the organic binder and spacer material. The unit was then placed into a high temperature oven and sintered at a temperature of 1550° C. having an atmosphere of 98% nitrogen and 2% hydrogen. Electrical connection was made to the two metallized layers at vias extending from the layers and the unit was tested and determined to have a capacitance of approximately 9 picofarads. A layer was cut off the top or diaphragm portion of the unit to make the unit responsive to a selected range of pressures. The unit was then subjected to a series of forces to simulate pressures ranging from 0 to approximately 20 psi at which capacitance values were determined and the device was found to have a reproducible curve.

Figure 2A:
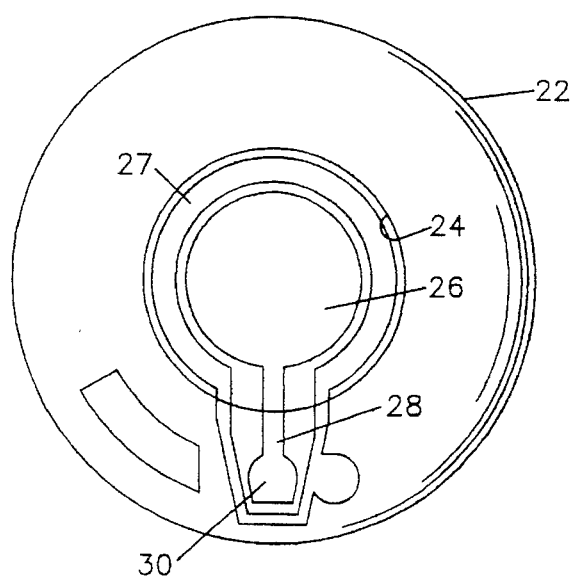
FIG. 2a is a top plan view of the base with the metallized layer deposited thereon.
Figure 2B:
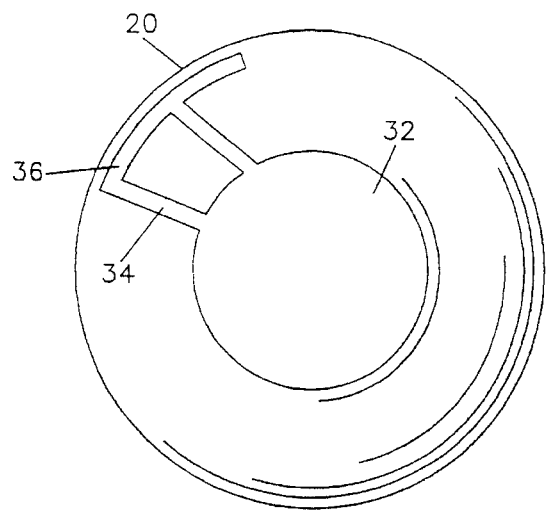
FIG. 2b is a bottom plan view of the diaphragm with the metallized layer deposited thereon.

FIG. 2a shows a typical metallization pattern for base 22 including capacitor plate 26 and via 28 extending to a terminal pad 30 and a guard ring 27. Another metallization pattern is applied to diaphragm 20 including capacitor plate 32, via 34 and terminal pad 36.

Figure 6:
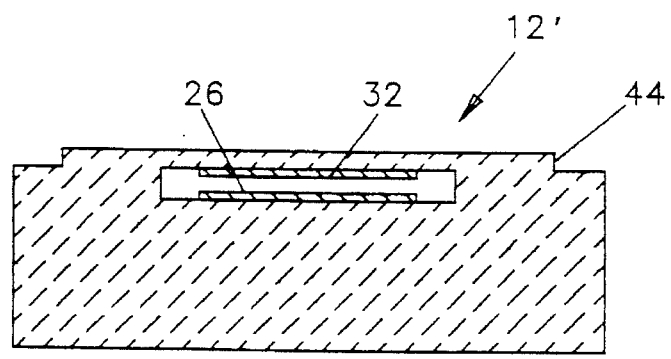
FIG. 6 is a cross section, similar to FIG. 4, of a modified transducer.

The specific thickness of the diaphragm chosen for a selected range of pressures can be obtained by starting with the appropriate thickness required to obtain, after pressing and firing, the thickness desired, e.g., 30 mils. Alternatively, a standard thickness can be formed and can then be machined after the unit is sintered to the final selected thickness by known grinding techniques. Some type of indexing means can be provided to facilitate this machining step. For example, as seen in FIG. 6, the diaphragm of transducer 12' can be formed having a smaller diameter 44 than the base, or with notched areas to serve as a reference point so that the precise thickness of the diaphragm can be determined. Alternatively, the diaphragm could be doped with known materials to give it a different shade or color than the base.

It will be appreciated that uniform spacing between the capacitor plates or electrodes of a small dimension, i.e., of approximately 2.5 mils or less, is necessary in order to obtain satisfactory performance. Forming the recess by pressing it into one or both of the two components from which the monolithic ceramic body is made allows for precise control of the dimensions of the recess including required parallelism and flatness of the upper and lower surfaces defining the gap. It is known to create larger cavities where such precise dimensional control of the height of the gap as well as parallelism and flatness of the upper and lower surfaces of the gap is not required by using one or more separate annular ceramic layers having a thickness selected to provide the desired depth of the cavity and placing that between other members and then firing to obtain a unitary body useful for example as a strain sensor. This method however would not be suitable for use with a pressed part, having the same shrinkage characteristics as the other components of the device, as thin as that required to obtain the precisely controlled gap which would be needed in a transducer made in accordance with the invention.

It is also within the purview of the invention to employ low temperature ceramics such as alumina, silica or other conventional materials and a glass binder used in making electronic substrates, which can be sintered at temperatures such as approximately 850°–1000° C. in air along with standard thick film inks for metallization, such as silver palladium, gold, copper and the like. The glass composition is chosen so that densification is complete at that temperature. A significant advantage of using low temperature ceramics is that it avoids having to use a controlled atmosphere during the co-firing process.

It is also within the purview of the invention to print the metallization layers on opposite sides of a spacer element or on one side of separate elements if more than one spacer element is used. The metallized layers will be transferred to the respective surfaces of the diaphragm and base during the pressing operation.

In view of the above it will be seen that the instant invention is less expensive to produce due to the fact that fewer processing steps are required compared to corresponding prior art units. Further, the unit can be fabricated with no grinding operation or at most no more than one grinding operation compared to the need for grinding both sides of the diaphragm and base of prior art units, thereby saving up to 40% or more of the cost of making the unit. In addition, there is no glass spacer or seal used and therefore no problems with matching the expansion rates of different materials and mechanical properties resulting from any mismatch.

It should be understood that though preferred embodiments of the invention have been described by way of illustrating the invention, this invention includes all modifications and equivalents of the disclosed embodiments falling within the scope of the appended claims.

We claim:

1. A method for fabricating a capacitive pressure transducer comprising the steps of:

taking granular ceramic powder particles coated with an organic binder and pressing the powder into a flat diaphragm and a relatively thick base having a recess formed in a top surface of the base, applying a metallized layer on a bottom surface of the diaphragm and in the recess in the top surface of the base, placing the diaphragm on the top surface of the base covering the recess, pressing the diaphragm and the base together, without heating, at room temperature with sufficient pressure to adhere the diaphragm to the base to form a unitary unit while leaving open cells in the ceramic powder material, raising the temperature of the unit to a first debinderizing temperature to purge the binder organics from the unit through the open cells thereof, and placing the unit in a reducing atmosphere and raising the temperature thereof to the sintering temperature of the ceramic, higher than the first temperature, to sinter the ceramic particles together forming a monolithic body and to bond the metallized layers to the ceramic.

2. A method according to claim 1 further including the step of taking a spacer of organic material having a thickness approximately the same as the depth of the recess and placing it in the recess prior to placing the diaphragm on the top surface of the base.

3. A method according to claim 2 in which the spacer material is chosen from the group consisting of polypropylene carbonate and acetal resin.

4. A method according to claim 1 in which the first temperature is in the range of approximately 300° F.

5. A method according to claim 1 in which the ceramic comprises alumina and the sintering temperature is within the range of approximately 1400°–1700° C.

6. A method according to claim 5 in which the metallized layer is selected from the group consisting of molybdenum/manganese, tungsten and platinum.

7. A method according to claim 1 in which the diaphragm and the base are pressed together to adhere one to the other at a pressure within the range of approximately 1,000 and 30,000 psi.

8. A method according to claim 1 in which the ceramic powder particles are formed of low firing temperature ceramics.

9. A method for fabricating a capacitive pressure transducer comprising the steps of taking granular ceramic powder particles coated with an organic binder and pressing the into first and second portions with at least a recess in one of said first or second portions, each having an outer periphery, placing a spacer means of organic material in said recess between the first and second portions, pressing facing surfaces of the first and second portions together with the spacer therebetween, without heating, at room temperature with sufficient pressure to cause the two portions to adhere to one another to form a unit while still leaving open cells in the material, raising the temperature of the unit to a first debinderizing temperature to decompose and purge the binder organics and the spacer from the unit through the open cells thereof, and raising the temperature of the unit to the sintering temperature of the ceramic to sinter the particles together forming a monolithic body with a cavity therein.

10. A method according to claim 9 in which metallized layers are deposited onto the facing surfaces of the first and second portions prior to being pressed together.

11. A method for fabricating a capacitive pressure transducer comprising the steps of taking ceramic powder particles coated with an organic binder and pressing the powder into first and second portions each having an outer periphery, placing a spacer means of organic material having an outer periphery smaller than the outer periphery of either the first or the second portions between the first and second portions, said spacer means having a metallized layer on each of its opposite sides which contact first and second potions, pressing facing surfaces of the first and second portions together with the spacer therebetween with pressure at least as high as 1000 psi to cause the two portions to adhere to one another to form a unit while still leaving open cells in the material and to transfer the metallized layers to the respective first and second portions, raising the temperature of the unit to a first debinderizing temperature to decompose and purge the binder organics and the spacer from the unit through the open cells thereof, and raising the temperature of the unit to the sintering temperature of the ceramic to sinter the particles together forming a monolithic body with a cavity therein.

12. A method according to claim 11 in which the spacer means comprises at least two sheets of organic material.

13. A method according to claim 11 in which the ceramic powder particles are formed of low firing temperature ceramics.

14. A method for fabricating a capacitive pressure transducer comprising the steps of taking granular ceramic powder particles coated with an organic binder and pressing the powder into a thin diaphragm having a bottom surface and a relatively thick base having a top surface with a recess having a continuous bottom wall formed in at least one of the bottom surface of the diaphragm and the top surface of the base, applying a respective layer of electrically conductive material on the bottom surface of the diaphragm and on the top surface of the base, placing the bottom surface of the diaphragm on the top surface of the base covering the recess, pressing the diaphragm and the base together, without heating, at room temperature with sufficient pressure to adhere the diaphragm to the base to form a unitary unit while leaving open cells in the ceramic powder material, and placing the unit in a high temperature furnace and raising the temperature of the unit to the sintering temperature of the ceramic to sinter the ceramic particles together forming a monolithic body and bonding the layers of electrically conductive material to the body.

15. A method for fabricating a capacitive pressure transducer according to claim 14 further including the step of taking a spacer of organic material having a thickness approximately the same as the depth of the recess and placing it in the recess prior to placing the diaphragm on the top surface of the base.

* * * * *